(12) United States Patent
Hodgins et al.

(10) Patent No.: US 8,988,422 B1
(45) Date of Patent: Mar. 24, 2015

(54) SYSTEM AND METHOD FOR AUGMENTING HAND ANIMATION WITH THREE-DIMENSIONAL SECONDARY MOTION

(75) Inventors: Jessica Kate Hodgins, Pittsburgh, PA (US); Eakta Jain, Pittsburgh, PA (US); Yaser Sheikh, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 1132 days.

(21) Appl. No.: 12/972,126

(22) Filed: Dec. 17, 2010

(51) Int. Cl.
*G06T 15/00* (2011.01)
*G06T 13/40* (2011.01)
*G06T 13/80* (2011.01)

(52) U.S. Cl.
CPC ............... *G06T 13/40* (2013.01); *G06T 13/80* (2013.01)
USPC ............ 345/419; 345/473; 345/474; 345/475

(58) Field of Classification Search
CPC .............................. G06T 13/80; G06T 13/40
USPC .................... 345/419, 473, 474, 475
See application file for complete search history.

(56) References Cited

U.S. PATENT DOCUMENTS

| | | | | |
|---|---|---|---|---|
| 7,864,181 | B1 * | 1/2011 | Baraff | 345/475 |
| 7,872,653 | B2 * | 1/2011 | Zhou et al. | 345/473 |
| 7,937,253 | B2 * | 5/2011 | Anast et al. | 703/6 |
| 8,269,778 | B1 * | 9/2012 | Baraff et al. | 345/473 |
| 8,599,197 | B1 * | 12/2013 | Yu et al. | 345/419 |

OTHER PUBLICATIONS

Agarwal A., Triggs B.: "Recovering 3D Human Pose From Monocular Images". Pattern Analysis and Machine Intelligence, IEEE Transactions on 28, 1 (2006), p. 1-15.
Bregler C., Malik J.: "Tracking People with Twists and Exponential Maps". IEEE Conference on Computer Vision and Pattern Recognition (1998). 8 pgs.
Corrêa W. T., Jensen R. J., Thayer C. E., Finkelstein A.: "Texture Mapping for Cel Animation". In ACM SIGGRAPH '98 (1998), 12 pgs.
Davis J., Agrawala M., Chuang E., Popovic Z., Salesin D. H.: "A Sketching Interface for Articulated Figure Animation". In ACM SIGGRAPH/Eurographics Symposium on Computer Animation (2003), 10 pgs.
Elgammal A., Lee C.: "Inferring 3D Body Pose From Silhouettes Using Activity Manifold Learning". IEEE Conference on Computer Vision and Pattern Recognition (2004) 8 pgs.

(Continued)

*Primary Examiner* — Phu K Nguyen
(74) *Attorney, Agent, or Firm* — Patterson + Sheridan, LLP

(57) ABSTRACT

Techniques are disclosed for augmenting hand-drawn animation of human characters with three-dimensional (3D) physical effects to create secondary motion. Secondary motion, or the motion of objects in response to that of the primary character, is widely used to amplify the audience's response to the character's motion and to provide a connection to the environment. These 3D effects are largely passive and tend to be time consuming to animate by hand, yet most are very effectively simulated in current animation software. The techniques enable hand-drawn characters to interact with simulated objects such as cloth and clothing, balls and particles, and fluids. The driving points or volumes for the secondary motion are tracked in two dimensions, reconstructed into three dimensions, and used to drive and collide with the simulated objects.

30 Claims, 11 Drawing Sheets

(56) References Cited

OTHER PUBLICATIONS

Hornung A., Dekkers E., Kobbelt L.: "Character Animation From 2D Pictures and 3D Motion Data". ACM Transactions on Graphics 26, 1 (Jan. 2007), 1:1-1:9. 9 pgs.
Herda L., Urtasun R., Fua P.: "Hierarchical Implicit Surface Joint Limits to Constrain Video-Based Motion Capture". European Conference on Computer Vision (2004), p. 1-14.
Johnston S. F.: Lumo: "Illumination for Cel Animation". In NPAR 2002: Second International Symposium on Non Photorealistic Rendering (Jun. 2002), pp. 45-52 & 156, 9 pgs.
Lee J., Chai J., Reitsma P. S. A., Hodgins J. K., Pollard N. S.: "Interactive Control of Avatars Animated with Human Motion Data". ACM SIGGRAPH 2002 21, 3 (Jul. 2002), 10 pgs.
Petrovi'C L., Fujito B., Williams L, Finkelstein A.: "Shadows for Cel Animation". In ACM SIGGRAPH 2000 (Jul. 2000), 6 pgs.
Rosenhahn B., Brox T., Cremers D., Seidel H.-P.: "Staying Well Grounded in Markerless Motion Capture". Pattern recognition—Proc. DAGM 5096 (2008), 385-395, 11 pgs.
Sminchisescu C., Kanaujia A., Metaxas D.: "Discriminative Density Propagation for 3D Human Motion Estimation". IEEE Conference on Computer Vision and Pattern Recognition (2005). p. 1-8.
[BLCD02] Bregler C., Loeb L., Chuang E., Deshpande H.: "Turning to the Masters: Motion Capturing Cartoons". ACM Transactions on Graphics 21, 3 (Jul. 2002), 9 pgs.
Baran I., Vlasic D., Grinspun E., Popovi'C J.: "Semantic Deformation Transfer". ACM Transactions on Graphics 28, 3 (Jul. 2009), 36:1-36:6. 6 pgs.
Cooper D.: 2D/13D Hybrid Character Animation on "Spirit". In ACM SIGGRAPH '02 (2002), 1 pg.
Demirdjian D., Ko T., Darrel T.: "Constraining Human Body Tracking". IEEE International Conference on Computer Vision (2003). p. 1-8.
Gleicher M.: "Retargetting Motion to New Characters". In ACM SIGGRAPH '98 (Jul. 1998), Computer Graphics Proceedings, Annual Conference Series, p. 1-10.
Ellis D.: "Dynamic Time Warp" (dtw) in matlab. Web resource, available: http://www.ee.columbia.edu/ dpwe/resources/matlabidtw/, 2003. 5 pgs.
Ikemoto L., Arikan O., Forsyth D.: "Generalizing Motion Edits with Gaussian Processes". ACM Transactions on Graphics 28, 1 (Jan. 2009), 1:1-1:12. 12 pgs.
Jain E., Sheikh Y., Hodgins J. K.: "Leveraging the Talent of Hand Animators to Create Three-Dimensional Animation". In ACM SIGGRAPH/Eurographics Symposium on Computer Animation (Aug. 2009). 10 pgs.
Sidenbladh H., Black M., Sigal L.: "Implicit Probabilistic Models of Human Motion for Synthesis and Tracking". European Conference on Computer Vision (2002). p. 784- 800, 17pgs.
Li Y., Gleicher M., Xu Y.-Q., Shum H.-Y.: "Stylizing Motion with Drawings". In ACM SIGGRAPH/Eurographics Symposium on Computer Animation (2003), 11 pgs.
O'Brien J. F., Zordan V. B., Hodgins J. K.: "Combining Active and Passive Simulations for Secondary Motion". IEEE Comput. Graph. Appl. 20, 4 (2000), 86-96, 11 pgs.
Rosenhahn B., Brox T., Cremers D., Seidel H.-P.: "Online Smoothing for Markerless Motion Capture". Pattern recognition—Proc. DAGM 4713. p. 163-172, 10 pgs.
Rosenhahn B., Brox T., Seidel H.-P.: "Scaled Motion Dynamics for Markerless Motion Capture". IEEE Conference on Computer Vision and Pattern Recognition (2007). 8 pgs.
Sidenbladh H., Black M. J., Fleet D. J.: "Stochastic Tracking of 3D Human Figures Using 2D Image Motion". In European Conference on Computer Vision (2000), Springer-Verlag, pp. 702-718.
Sakoe H., Chiba S.: "Dynamic Programming Algorithm Optimization for Spoken Word Recognition". IEEE transactions on acoustics, speech and signal processing. vol. ASSP-26, No. 1 Feb. 1978. Readings in speech recognition (1978), p. 43-49, 7 pgs.
Bourdev L., Malik J.: "Poselets: Body Part Detectors Trained using 3D Human Pose Annotations". In International Conference on Computer Vision (Sep. 2009). 8 pgs.
Sykora D., Sedlack D., Jinchao S., Dingliana J., Collins S.: "Adding Depth to Cartoons Using Sparse Depth (in)Equalities". In Eurographics (2010), vol. 29, 8 pgs.
Sminchisescu C., Triggs B.: "Estimating Articulated Human Motion with Covariance Scaled Sampling". International Journal of Robotics Research. IEEE Conference on Computer Vision and Pattern Recognition (2003). 24 pgs.
Taylor C. J.: "Reconstruction of Articulated Objects from Point Correspondences in a Single Uncalibrated Image". Computer Vision and Image Understanding 80. Jul. 14, 1999, 16 pgs.
Urtasun R., Fleet D. J., Fua P.: "Temporal Motion Models for Monocular and Multiview 3-D Human Body Tracking". Computer Vision and Image Understanding 104, (2006), 36 pgs.
Wei X., Chai J.: "Modeling 3D Human Poses from Uncalibrated Monocular Images". IEEE International Conference on Computer Vision (2009), 8 pgs.
Wood D. N., Finkelstein A., Hughes J. F., Thayer C. E., Salesin D. H.:"Multiperspective Panoramas for Cel Animation". In ACM SIGGRAPH '97 (Aug. 1997), Computer Graphics Proceedings, Annual Conference Series, 8 pgs.
Wu Y., Hua G., Yu T.: "Tracking Articulated Body by Dynamic Markov Network". IEEE International Conference on Computer Vision (2003), 8 pgs.
Zhao L., Safonova A.: :"Achieving Good Connectivity—in Motion Graphs". Eurographics/ACM SIGGRAPH Symposium on Computer Animation (2008), 10 pgs.
Moeslund T. B., Granum E.: "A Survey of Computer Vision-Based Human Motion Capture". Computer Vision and Image Understanding: CVIU 81, (2001), 231-268, 38 pgs.
Anjyo K.: "Bridging the Gap Between 2D and 3D: A Stream of Digital Animation Techniques". In Computer Graphics and Applications, 2001. Proceedings. Ninth Pacific Conference on (2001), 4 pgs.
Lee H. J., Chen Z.: "Determination of 3D Human Body Postures from a Single View". Computer Vision, Graphics, and Image Processing 30 (1985), 148-168, 21 pgs.
Ramanan D., Forsyth D., Zisserman A.: "Tracking People by Learning Their Appearance". IEEE Transactions on Pattern Analysis and Machine Intelligence 29, (Jan. 2007), 65-81, 17 pgs.
Culhane S.: "Animation from Script to Screen". St.Martin's Press, New York, 1990. p. 17 and p. 19, 5 pgs.
Daniels E.: "Deep Canvas in Disney's Tarzan". In ACM SIGGRAPH '99 (1999), ACM Press / ACM SIGGRAPH, 3 pgs.
Gonzales R., Woods R.: "Digital Image Processing", 2 ed. Prentice Hall, 2002. 2 pgs.
Hartley R., Zisserman A.: "Multiple View Geometry in Computer Vision", 2 ed. Cambridge University Press, 2003. p. 88-90 section 4.1, 6 pgs.
Johnston O., Thomas F.: "The Illusion of Life: Disney Animation". Disney Editions; Rev Sub edition, 1981. p. 229-284, 58 pgs.

\* cited by examiner

SYSTEM AND METHOD FOR AUGMENTING HAND ANIMATION WITH THREE-DIMENSIONAL SECONDARY MOTION

BACKGROUND

1. Field of the Invention

Embodiments of the present invention relate to the field of computer graphics and, in particular, to augmenting hand-drawn animation with three-dimensional (3D) secondary motion.

2. Description of the Related Art

Secondary motion is the motion of scene elements in response to the movement of the primary character. Secondary motion is often used to amplify the character's motion and personality via effects that appear to be driven by his motion. Examples of secondary motion include the swishing of a robe, or the sloshing of water in a pail. The animation of these effects is done after the character motion is finalized, either as a separate layer in hand-animation, or as a simulation in 3D animation. These elements do not, in general, have a distinct character or personality of their own, i.e., they are passive, not animate.

Passive effects such as cloth, fluids or particles have many degrees of freedom, are involved in frequent collisions, and have complex interactions with characters. These properties make cloth, fluids, and particles difficult to animate by hand either on paper or using computer software. As a result, a great deal of research has focused on the simulation of these effects with impressive results in research prototypes that have subsequently been incorporated into commercial animation software. 3D animation may take advantage of simulated effects when a character's location and pose in 3D space is known and can be used as a driving signal to simulate the cloth, fluids, or particles. Hand, or two-dimensional (2D), animation cannot directly benefit from the techniques developed for 3D animation as the motion of the character is only determined on the image plane, not in the full three dimensions required to drive and interact with a physical simulation.

There has been work in the past on mixing 2D and 3D elements in a scene. One of the most well remembered works is Tarzan's Deep Canvas, where a 3D background is mixed with a 2D hand animated foreground character. However, the techniques used to produce works such as Tarzan's Deep Canvas did not enable the kind of physical interaction between the hand-drawn elements and the 3D elements needed to create secondary motion; for example, ripples when Tarzan steps into a pool of water. In other words, the 3D scene elements did not physically interact with the 2D scene elements.

SUMMARY

Embodiments of the invention provide techniques for augmenting hand-drawn animation with 3D secondary motion to allow an animated character to drive the motion of 3D scene elements. Secondary motion, or the motion of objects in response to that of the primary character, is widely used to amplify the audience's response to the character's motion and to provide a connection to the environment. These 3D effects are largely passive and tend to be time consuming to animate by hand, yet most are very effectively simulated in current animation software. The techniques enable hand-drawn characters to interact with simulated objects such as cloth and clothing, balls and particles, and fluids. The driving points or volumes for the secondary motion are tracked in two dimensions, reconstructed into three dimensions, and used to drive and collide with the simulated objects. User interaction that can be reasonably integrated into the traditional animation pipeline of drawing, cleanup, inbetweening, and labeling is employed to generate the driving points and volumes.

One embodiment of the invention includes a method for constructing a three-dimensional animation. This method may generally include receiving a human-generated two-dimensional animation depicting an object in one or more scenes and receiving existing three-dimensional motion data that is generated from a separate source than the two-dimensional animation and stored in a library of three-dimensional motion data. A three-dimensional animation is constructed using image plane coordinates from the two-dimensional animation and depth coordinates from the three-dimensional motion data.

Another embodiment of the invention includes a method for constructing a two-dimensional animation augmented with secondary motion. This method may generally include receiving a human-generated two-dimensional animation and receiving depth values from computer-generated three-dimensional motion data. A collision volume of an object in the two-dimensional animation is constructed and a simulated three-dimensional object that interacts with the collision volume is rendered to generate a rendered three-dimensional object with secondary motion. The two-dimensional animation is combined with the rendered three-dimensional object to generate the two-dimensional animation augmented with secondary motion.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide techniques for augmenting hand-drawn animation with 3D secondary motion to allow a traditionally animated character to drive the motion of 3D scene elements. Secondary motion, or the motion of objects in response to that of the primary character, is widely used to amplify the audience's response to the character's motion and to provide a connection to the environment. These 3D effects are largely passive and tend to be time consuming to animate by hand, yet most are very effectively simulated in current animation software. The techniques enable hand-drawn characters to interact with simulated objects such as cloth and clothing, balls and particles, and fluids. In one embodiment, driving points or volumes for the secondary motion are tracked in two dimensions, reconstructed into three dimensions, and used to drive and collide with the simulated objects. User interaction that can be reasonably integrated into the traditional animation pipeline of drawing, cleanup, inbetweening, and labeling is employed to generate the driving points and volumes.

One embodiment of the invention provides a computer-implemented method for determining depth data for a two-dimensional animation. The method includes receiving the two-dimensional animation, receiving annotations including virtual markers of (x,y) positions of the two-dimensional animation, and receiving three-dimensional motion data that is generated from a separate source than the two-dimensional animation. The virtual markers in the two-dimensional animation with (x,y,z) are associated with positions of the three-dimensional motion data. A z coordinate of a first (x,y) position of a first marker is determined based on a first (x,y,z) position of the three-dimensional motion data that is associated with the first marker as a depth value of the first marker.

The techniques for adding secondary motion onto a hand-animated character preserve the animator's original lines, add secondary motion via existing simulation methods, and integrate well into the standard animator's pipeline. Three technical contributions enable the addition of secondary motion to hand animations. First, because the 3D reconstruction of a 2D signal is ambiguous, the 2D-3D ambiguity is resolved using z-depth information from motion capture data of similar behaviors to those performed by the animated character. Second, plausible collision volumes are created in 3D. These collision volumes corresponding to the animated character can interact with the desired physical simulation to produce the secondary motions when 3D computer generated objects are rendered. Third, for the interaction to look believable, the rendered objects (or simulations) are composited with the hand-drawn frames while maintaining relative depth ordering.

System Overview

Figure 1A:
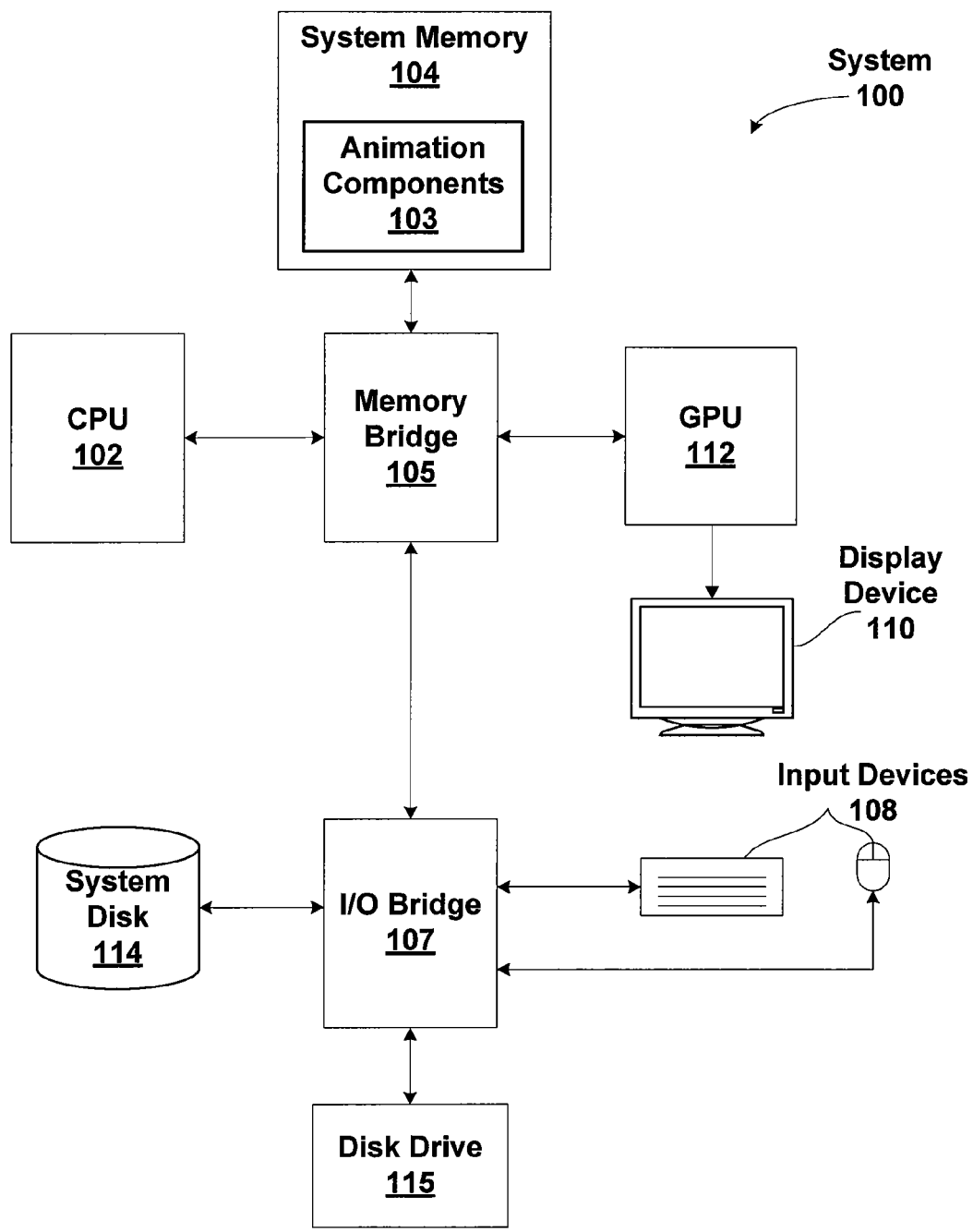
FIG. 1A is a block diagram of a system configured to implement one or more aspects of the present invention.

FIG. 1A is a diagram illustrating an example system 100 for animation generation and/or animation playback. The system 100 may be configured to generate animation sequences in real-time or for playback. The system 100 may also be configured to execute a game and to generate animations during execution of the game. The system 100 is further configured to accept and process input from a user and to provide data for displaying the results of such user input.

The user inputs commands using input devices 108. The input devices 108 may be any device that allows the user to interact with the system 100. For example, the input device 108 may comprise a keyboard, a joystick, a controller, a microphone, a camera, a keypad, or a series of buttons, among other devices and features. The system 100 outputs graphics and animations to a display device 110, the display device 110 may be any device that receives data for display and presents it visually to the user. For example, the display device 110 may include a cathode ray tube, a plurality of light emitting diodes (LEDs), a liquid crystal display (LCD), a portable video game console, or a projector, among other devices and features.

The system 100 includes a central processing unit (CPU) 102 that is in communication with the input devices 108 through an input/output (I/O) bridge 107. The CPU 102 communicates with a graphics processing unit (GPU) 112 through a memory bridge 105 to generate images that are output to the display device 110. In some embodiments, one or more of the GPU 112, CPU 102, I/O bridge 107, and memory bridge 105 are integrated into a single device. The system 100 may further include a system memory 104 in communication with the CPU 102 through the memory bridge 105. The CPU 102 is configured to retrieve and execute programming instructions stored in the system memory 104 and system disk 114. Similarly, the CPU 102 is configured to store and retrieve application data residing in the system memory 104 and system disk 114.

The system memory 104 may comprise certain types of random access memory (RAM) such as dynamic random access memory (DRAM) or static random access memory (SRAM), or may comprise any other type of volatile memory. The volatile memory 104 may be used to store data and/or instructions during operation of the CPU 102. In particular, the system memory 104 may store animation components 103 that are used to generate animations that include secondary motion. In other embodiments the animation components 103 are stored in the system disk 114 Those skilled in the art will recognize other types of memory and uses thereof.

The system 100 may further include a non-volatile system disk 114 that is in communication with the CPU 102 through the I/O bridge 107 and memory bridge 105. The system disk 114 may include flash memory, magnetic storage devices, hard disks, or read-only memory (ROM) such as erasable programmable read-only memory (EPROM), or any other type of non-volatile memory. The system disk 114 may be used to store games, instructions, character information, game status information, or any other information that is to be retained if power to the system 100 is removed. The system 100 may comprise an interface to install or temporarily locate additional non-volatile memory. Those skilled in the art will recognize other types of non-volatile memory and uses thereof.

The GPU 112 is configured to render data supplied by the CPU 102 for display on the display device 110. The GPU 112 may be configured to perform any number of functions related to providing data for display on the display device 110. For example, the GPU 112 may be configured to render a plurality of polygons, apply shading or texture, create data representative of a three-dimensional environment, or convert between coordinate spaces, among other functions. Those skilled in the art will recognize other configurations and functionalities of the GPU 110.

The system 100 may further include a disc drive 115 in communication with the CPU 102. The CPU 102 may read data from a disc inserted into the disc drive 115. In some embodiments, the system 100 is configured to record data on the disc using the disc drive 115. In this way, data relating to animation may be transported to or from the system 100. Alternatively, animation data may be transmitted to/from system 100 via a network.

The system 100 is not limited to the devices, configurations, and functionalities described above. For example, although a single volatile memory 106, non-volatile memory 108, GPU 110, disc drive 112, input device 114, and display device 116 are illustrated, a plurality of any of these devices may be implemented internal or external to the system 100. In addition, the system 100 may comprise a power supply or a network access device. Those skilled in the art will recognize other such configurations of the system 100. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

Graphics and animations for display by the system 100 can be created using any number of methods and devices. A variety of commercially available modeling software may be used to generate graphics and animations representing a three-dimensional environment. Using such software, an animator can create objects and simulations of objects that can be used by the game engine of the system 100 to provide data for display on the display device 110.

Figure 1B:
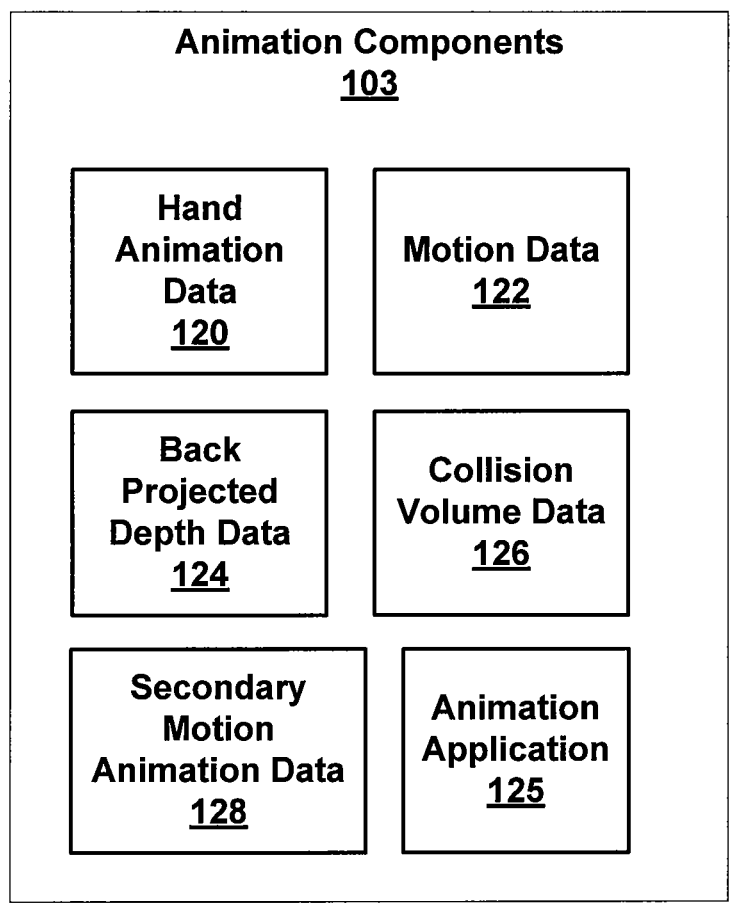
FIG. 1B is a block diagram of the animation components of FIG. 1A that are configured to implement one or more aspects of the present invention.

FIG. 1B is a block diagram of the animation components 103 of FIG. 1A that are configured to implement one or more aspects of the present invention. The animation components 103 comprises an animation application 125 including instructions or data that can be used to generate animation. In particular, the animation application 125 may be configured to augment hand-drawn animation with 3D secondary motion. Inputs to the animation application 125 may include hand animation data 120, motion data 122, back-projected depth data 124, collision volume data 126. When the animation application is executed by the CPU 102 and/or GPU 112, secondary motion animation data 128 are generated. The secondary motion animation data 128 may be combined with the hand animation data 120 to generate augmented animation that is stored in the system memory 104 or dedicated graphics memory associated with the GPU 112.

The hand animation data 120 comprises hand-drawn 2D images or characters and annotations that are added to the hand-drawn images or characters by a user. A character may be an object or element with human characteristics and behaviors, such as an animated broom, car, or animal. The user-provided annotations may include virtual markers, bounding boxes, and segmentation of portions of the character, as described in conjunction with FIGS. 3A and 3B. The motion data 122 comprises motion capture poses that are selected by a user to provide z-depth information for the hand-drawn 3D characters. The motion data 122 may be selected from a library of three-dimensional motion data. The back-projected depth data 124 comprises estimated z-depth values corresponding to the virtual markers. The collision volume data 126 comprises collision volumes that are constructed based on the virtual markers and the bounding boxes to simulate a 3D model of the character. The secondary motion animation data 128 comprises motion of rendered portions of the image resulting from interactions with the 3D model of the character.

Figure 1C:
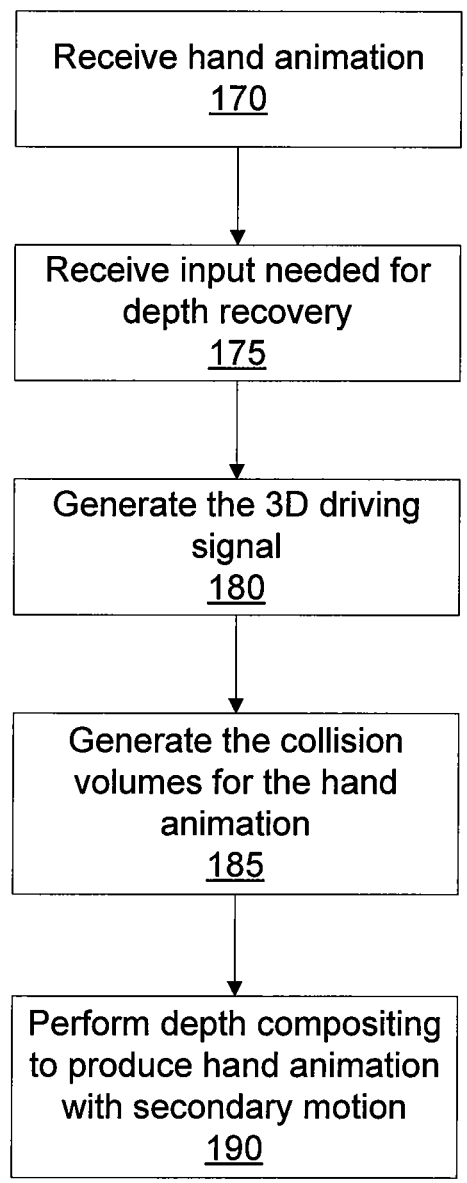
FIG. 1C is a flowchart of method steps describing the augmenting hand animation with 3D secondary motion, according to one embodiment of the invention.

FIG. 1C is a flowchart of method steps describing the augmenting hand animation with 3D secondary motion, according to one embodiment of the invention. Persons skilled in the art would understand that, even though the method is described in conjunction with the systems of FIGS. 1A-2D, any system configured to perform the method steps, in any order, is within the scope of embodiments of the invention.

The method begins at step 170, where a processing unit, such as the processing unit that executes the animation application 125, receives the hand-drawn images or characters included in the hand animation data 120. At step 175, the processing unit receives the input needed for depth recovery, such as the user-provided annotations included in the hand animation data 120 and the motion data 122. At step 180, the processing unit generates the 3D driving signal based on the hand animation data 120 and the motion data 122. The 3D driving signal is stored as the back-projected depth data 124. At step 185, the processing unit generates the collision volumes for the hand animation based on the hand animation data 120. At step 190, the processing unit performs depth compositing using the back-projected depth data 124 to combine the hand animation with simulated objects to generate secondary motion that responds to the collision volumes and 3D driving signal.

The animator's original lines may be preserved while adding secondary motion via existing simulation methods, and the techniques integrate well into the standard animator's pipeline. The user interaction needed to provide the annotations and specify the motion data 122 can be reasonably integrated into the traditional animation workflow. A user (layman or artist) annotates the joint locations of a hand-drawn 2D animation character with 'dots' for virtual markers and labels the various body parts. The different body parts are then segmented out based on the labels; for example, when colors are used to encode the different labels, all red pixels may be filed out from the non-red pixels to obtain the left arm. This user input fits well with the animation pipeline because each layer is already modified multiple times as it passes through the pipeline, and the required annotation is not a significant additional burden.

In addition to annotating the hand-drawn 2D animation, the user selects a motion capture segment from a database and the motion capture segment is stored as the motion data 122. The selected motion capture segment should have depth information that is similar to the hand-drawn sequence when viewed from the same point of view. In one embodiment, the selected motion capture segment is combined (using interpolation or other functions) with one or more additional motion capture segments to produce the motion data 122. In other embodiments, the selected motion capture segment is processed or filtered in a manner that modifies the z values to produce the motion data 122.

The 3D poses in the motion capture segment provide z-depth information. Frames that are drawn by an artist contain only the perspective view of the animated character. As a result, the motion of the animated character in 3D is not known. The ambiguity in 3D motion has two components—depth ambiguity and composite camera-character motion ambiguity. The motion capture segment resolves the depth ambiguity and the composite camera-character motion ambiguity. The hand-drawn 2D animation may then be "lifted" from two to three dimensions by performing a back-projection of the 2D animation into 3D space, as described in conjunction with FIGS. 4A and 4B.

Figure 2A:
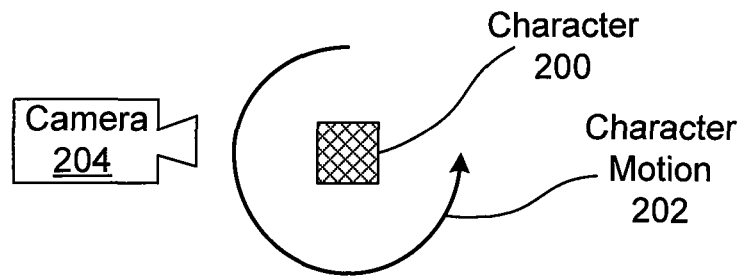
FIG. 2A illustrates an example of composite motion ambiguity between a camera and a character.

FIG. 2A illustrates a first example of composite motion ambiguity between a camera 204 and a character 200. The composite motion ambiguity occurs because the hand-drawn frames do not contain sufficient information to disambiguate the motion of the camera 204 from the motion of the character 200. In this first example, the camera 204 is stationary and the character 200 moves according to the trajectory shown by character motion 202.

Figure 2B:
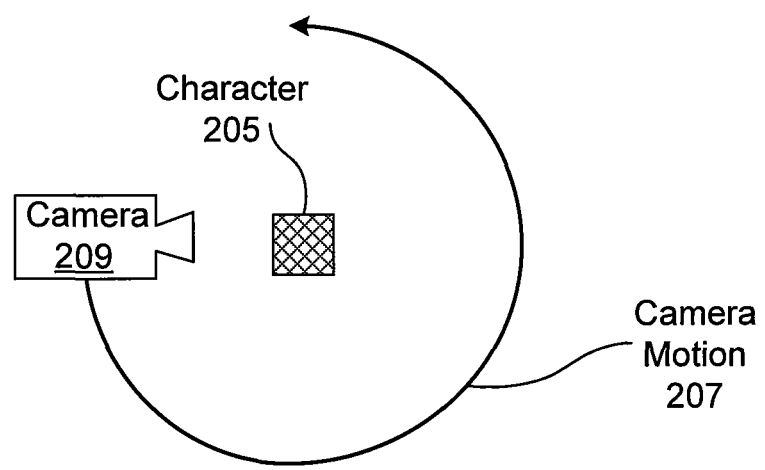
FIG. 2B illustrates another example of composite motion ambiguity between a camera and a character.

FIG. 2B illustrates a second example of composite motion ambiguity between a camera 209 and a character 205. In this second example, the character 205 is stationary and the camera 209 moves according to the trajectory shown by camera motion 207. For the purpose of articulated pose reconstruction, the first example and the second example are equivalent. However, when secondary motion (e.g. a simulated ponytail) is added, the first example and the second example do not produce the same secondary motion. Specifically, when the character 200 moves along the trajectory shown by the character motion 202, a simulated ponytail should swoosh in an arc, lagging behind the character in time. In contrast, when the character 205 is stationary the simulated ponytail should also be stationary. User selection of the motion is used in order to automatically generate the "correct" dynamic motion of the ponytail.

Figure 2C:
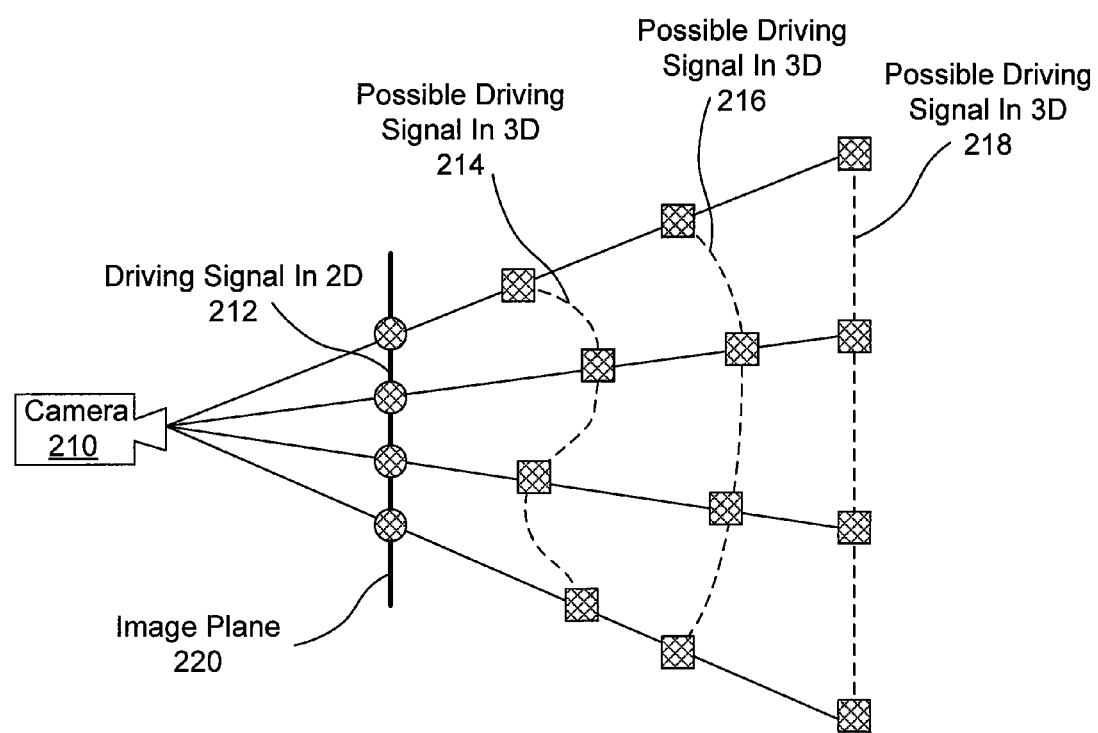
FIG. 2C illustrates an example of depth ambiguity of a 2D projected path.

FIG. 2C illustrates an example of depth ambiguity of a 2D projected path shown as a driving signal in 2D 212 that is coincident with an image plane 220. The depth ambiguity occurs because multiple 3D paths can yield the same 2D projected path viewed from a camera 210. Different 3D paths that each produce the same driving signal in 2D 212 are shown as possible driving signals in 3D 214, 216, and 218.

An assumption may be made that the character moves according to the user-selected motion capture segment, and that any remaining motion is camera motion. Alternatively, the camera motion may also be specified and included as part of the motion data 122 along with the selected motion capture segment. In one embodiment, information about camera moves may be obtained from a shot exposure sheet or from annotations about the world coordinate frame added by an artist during the process of animating. The selected motion capture segment may differ from the hand-animation in timing, in which case the selected motion capture segment may be preprocessed to synchronize with the hand animation using techniques known to those skilled in the art, such as the Dynamic Time Warp algorithm. The composite motion ambiguity may be resolved by registering the selected motion capture sequence with the 2D hand animation.

User-Provided Annotations

The peculiarities of 2D hand-drawn animations necessitate an approach that is different from prior work in computer vision. Conventional computer vision approaches do not preserve the poses of objects and characters in the 2D hand-drawn animation. In particular, the positions of specific points on a character may be modified in the image plane when those points are recreated in 3D using conventional techniques. Talented animators often purposely violate the geometry of the human body, using subtle squash and stretch to convey emotion or muscle activity. To create secondary motion, it is necessary to track these changes in body shape and reconstruct them plausibly in 3D, rather than filter them out as noise. Therefore, the positions of specific points on a character in the image plane are preserved when the points are back-projected to produce the collision volumes for the 2D hand-drawn animation.

The specific points having positions that are preserved are identified by a user as virtual markers. These virtual markers may be located at points of attachment where a simulated object connects to a hand-drawn character. For example, the string of a balloon may connect at a virtual marker on a character's hand. The top of a skirt may connect at one or more virtual markers along a character's waist. Other virtual markers that may be identified are collision points that, like the attachment points, may also produce secondary motion. For example, virtual markers may be located on a character's knees to interact with a simulated skirt. A virtual marker may be located on a character's foot to interact with simulated water in a puddle.

Figure 3A:
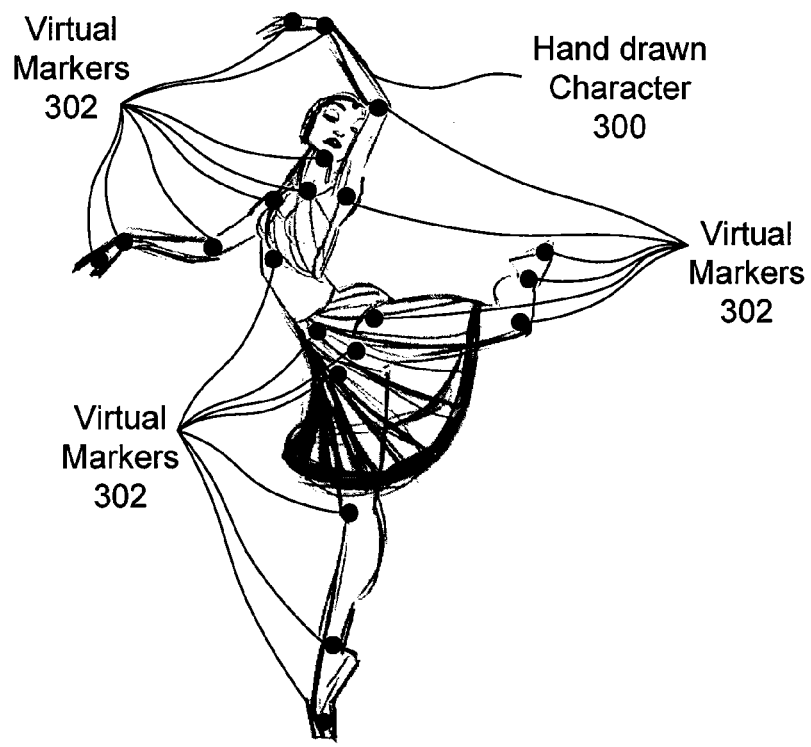
FIG. 3A is a diagram illustrating a hand-drawn character that is annotated with virtual markers, according to one embodiment of the invention.

FIG. 3A is a diagram illustrating a hand-drawn character 300 that is annotated with virtual markers 302, according to one embodiment of the invention. In one embodiment, a user (who can be a lay person) annotates the skeleton of the hand-drawn character with N virtual markers and an approximate bounding box for every limb with four markers each. The annotating is performed for each frame of an input 2D hand-drawn animation. In one embodiment, the virtual markers 302 are found automatically rather than being identified by a user. In one embodiment, locations of the virtual markers are determined by eroding a silhouette of an object to identify anatomic landmarks of the character.

The user may also provide a segmentation of the different body parts by labeling portions of the hand-drawn figure. For example, each arm may be labeled with a different color, each leg may be labeled with different colors, the torso may be labeled with another color, and the head may be labeled with still another color. The specification of the annotations may be performed during a traditional 2D animation workflow process. The virtual markers may be identified when the cleanup or inbetweening artist re-touches frames of the animated sequence. The labeling of different segments may be performed as part of the ink and paint process without requiring additional effort.

Figure 3B:
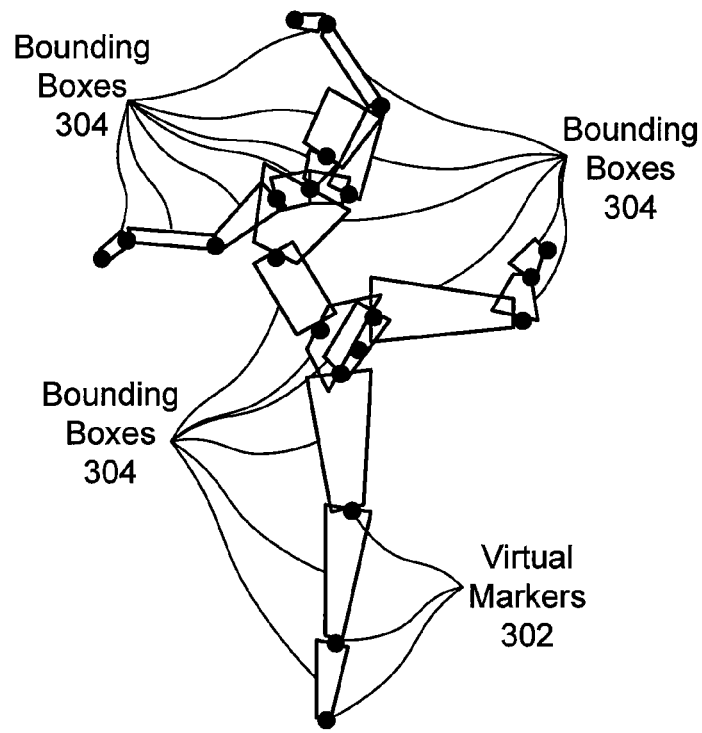
FIG. 3B is a diagram illustrating annotations of virtual markers and bounding boxes for the hand-drawn character shown in FIG. 3A, according to one embodiment of the invention.

FIG. 3B is a diagram illustrating annotations of virtual markers 302 and bounding boxes 304 for the hand-drawn character shown in FIG. 3A, according to one embodiment of the invention. The virtual markers 302 from FIG. 3A are shown in FIG. 3B, however, only some of the virtual markers 302 are labeled in FIG. 3B. In one embodiment, a user (who can be a lay person) annotates each frame of the input 2D hand-drawn animation with an approximate bounding box for different objects or portions of a character. Each corner of the bounding box corresponds with one of the virtual markers.

In addition to annotating the 2D input animation, the user may also select the motion data 122 that is used to generate the 3D driving signal. The motion data 122 may include motion capture data or computer generated motion data. The motion data may be adjusted in time (time warped) to better match the movement of the character and the time warped may also be stored as part of motion data 122. Points in the motion data 122 are associated with the virtual markers to register the motion data 122. Importantly, the motion data 122 is adapted to the positions of the virtual markers in the image plane. In other words, the positions of the virtual markers are preserved in order to retain the original poses of the objects and characters in the 2D animation that were drawn by an artist.

Figure 3C:
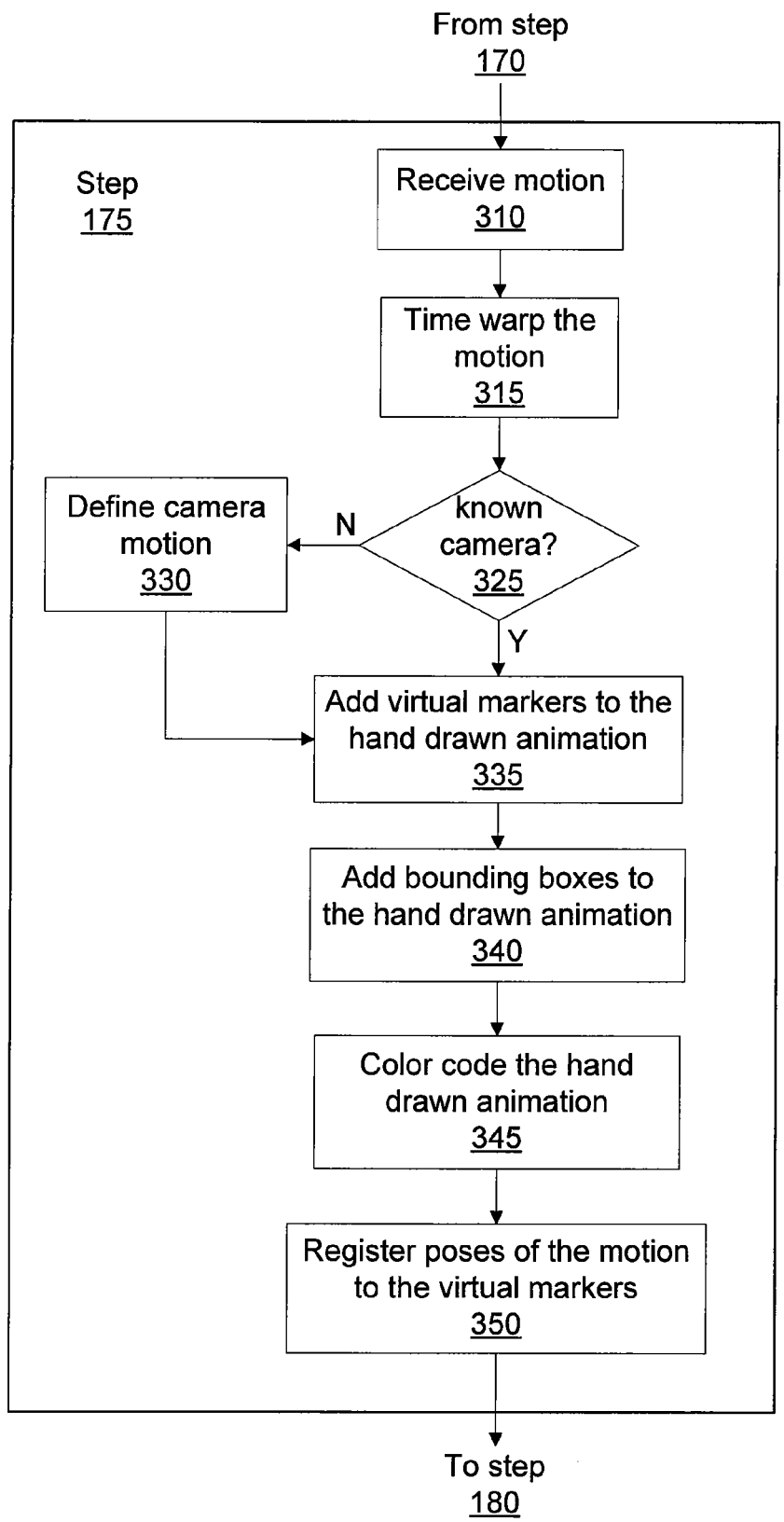
FIG. 3C is a flowchart of a method step shown in FIG. 2C, according to one embodiment of the invention.

FIG. 3C is a flowchart of the method step 275 shown in FIG. 2C to receive user input needed for depth recovery, according to one embodiment of the invention. Persons skilled in the art would understand that, even though the method is described in conjunction with the systems of FIGS. 1A-2D, any system configured to perform the method steps, in any order, is within the scope of embodiments of the invention.

The method step 310 begins at step 310, where a processing unit, such as the processing unit that executes the animation application 125, receives motion capture data or computer generated motion data as part of the motion data 122. At step 314 the processing unit time warps the motion capture data or computer generated motion data to approximate the movement of the character to generate time-warped motion data. Thus, the selected motion capture data does need not be an exact match for the motion of the hand-drawn animated character. At step 325, the processing unit determines if the camera motion is known, i.e., is included in the motion data 122. If, at step 325, the camera motion is not known, then at step 330 the camera motion is defined. Any motion of a character that is not caused by user-selected motion capture data or computer generated motion data, may be defined as camera motion. If, at step 325, the camera motion is known, then the processing unit proceeds directly to step 335.

At step 335 the processing unit receives the positions of user-specified virtual markers that are added to the hand-drawn animation. At step 340 the processing unit receives definitions of user-specified bounding boxes that are added to the hand-drawn animation. At step 345 the processing unit receives user-specified segmentation information (labeling) for the hand-drawn animation. At step 350 the processing unit receives the positions of points in the time-warped motion data that are associated with the virtual markers. The association of particular points in the time-warped motion data by a user enables registration of the poses of the time-warped motion data to the virtual markers.

Once the user input that is needed for depth recovery are received at step 175, depth values for at least some of the virtual markers may be generated at step 180 by lifting the 2D animation into 3D space based on the motion data 122, including the time-warped motion data that is associated with the virtual markers.

Generation of a 3D Driving Signal

Figure 4A:
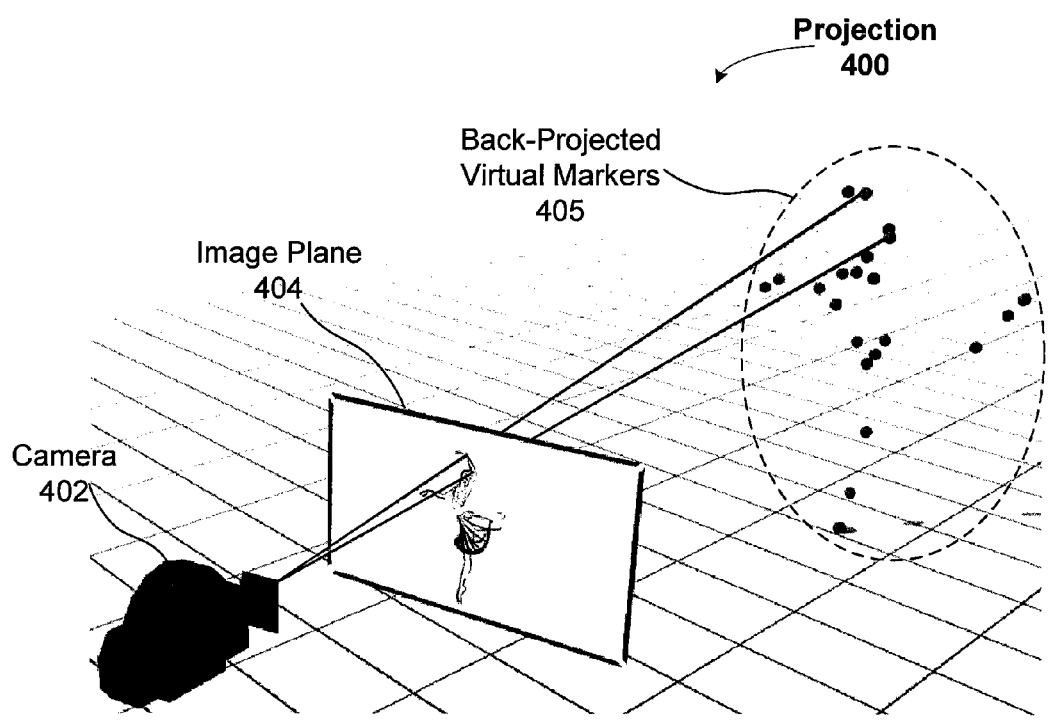
FIG. 4A is a diagram illustrating a back-projection of the 2D image into 3D space, according to one embodiment of the invention.

FIG. 4A is a diagram illustrating a back-projection 400 of the 2D image into 3D space, according to one embodiment of the invention. The virtual markers (not shown) located in the image plane 404 are back-projected from the camera 402 viewpoint into 3D space to generate the 3D virtual markers 405. Back-projection rays originating at the camera, pass through each virtual marker in the image plane 404 and end at one of the back-projected virtual markers 405. The z-depth (z coordinate value) of each respective back-projected virtual marker provides the z-depth for the virtual marker in the image plane 404.

Depth values of the registered virtual markers are recovered by estimating a 2D to 3D projection matrix M. For each frame i, the user-specified virtual markers for the hand-drawn frames are $$\tilde{x}_i = [\tilde{x}_1, \tilde{y}_1, \tilde{x}_2, \tilde{y}_2 \ldots \tilde{x}_N, \tilde{y}_N]^T.$$

The 3D marker positions for the time-warped motion data are $$\tilde{X}_i = [\tilde{X}_1, \tilde{Y}_1, \tilde{Z}_1, 1, \tilde{X}_2, \tilde{Y}_2, \tilde{Z}_2, 1, \ldots, \tilde{X}_N, \tilde{Y}_N, \tilde{Z}_N, 1,]^T,$$

expressed in homogeneous world coordinates. To increase robustness, the 3D marker positions are computed across a moving window of K frames around the frame i.

The primary objective, for good registration between points in the time-warped motion data and the virtual markers, is to minimize the geometric projection error, $$e_p = \sum_{t=-K/2}^{K/2} \|\tilde{x}_{i+t} - M\tilde{X}_{i+t}\|_2.$$

Because the projection matrix will also be used to render 3D simulated elements, domain specific constraints are included: skew and tilt are assumed to be zero, the scale factors are computed from the image resolution, the focal length may be pre-specified. The remaining unknown parameters are denoted $\rho(i) = (\theta_x(i), \theta_y(i), \theta_z(i), t_x(i), t_y(i), t_z(i))^T$.

Other domain-induced constraints are that the renderable camera should be above ground level, $e_g = (t_z - \mu)$, roll should be minimum, $e_r = |\theta_y|$, and the camera should move smoothly, $e_s = \|\rho(i) - \rho(i-1)\|_2$.

Finally, $\rho^*(i)$ is estimated such that $$\rho * (i) = \underset{\rho}{\operatorname{argmin}} r(\omega_1 e_p + \omega_2 e_g + \omega_3 e_r + \omega_4 e_s), \qquad \text{(equation 1)}$$

where $\omega_1$, $\omega_2$, $\omega_3$ and $+\omega_4$ are the associated weights.

Once the perspective projection operator M is obtained, 3D points that will project onto the user-specified virtual markers $\tilde{x}_{ij}$ under the action of M are located. At any frame i, each marker j may be represented in homogeneous world coordinates as $X_{ij}^w = [X_{ij}^w, Y_{ij}^w, Z_{ij}^w, 1]^T$. Then, $$\tilde{x}_{ij} \approx M X_{ij}^w.$$

The congruence relation may be rewritten, using a Direct Linear Transform (DLT) algorithm, as $$\tilde{x}_{ij} \times M X_{ij}^w = 0. \qquad \text{(equation 2)}$$

On rearranging the cross product as a matrix operation, $$CM \begin{bmatrix} X_{ij}^w \\ Y_{ij}^w \\ Z_{ij}^w \\ 1 \end{bmatrix} = 0, \qquad \text{(equation 3)}$$

where $$C = \begin{bmatrix} 0 & -1 & \tilde{y}_{ij} \\ 1 & 0 & -\tilde{x}_{ij} \\ -\tilde{y}_{ij} & \tilde{x}_{ij} & 0 \end{bmatrix}, \text{ and } M = \begin{bmatrix} m_1^T \\ m_2^T \\ m_3^T \end{bmatrix},$$

are known matrices. $m_i^T$ are the rows of the projection matrix M. The z-depth for each virtual marker may then be estimated in order to determine the corresponding depth coordinate for each virtual marker.

Now, it is sufficient to estimate the z-depths in order to completely determine the corresponding 3D points. The z-depth for each virtual marker is assumed to be equal to the corresponding value in the motion capture poses $\hat{X}$. For the $i^{th}$ frame, $$m_3^T \tilde{X}_{ij} = m_3^T \tilde{X}_{ij}^w \ \forall j=1,\ldots,N. \quad \text{(equation 4)}$$

Normalization constraints are added to fix the scale factors in homogenous coordinates to unity.

$$[0,0,0,1] X_{ij}^w = 1 \ \forall j=1,\ldots,N \quad \text{(equation 5)}$$

Stacking the constraints in Equations 3, 4 and 5 yields a linear system for each frame, $$A_{ij} X_{ij}^w = b_{ij}. \quad \text{(equation 6)}$$

Finally, we add a smoothing term by minimizing $\|X_{ij}^w - X_{(i+1)j}^w\|_2$, for all virtual markers j. The least squares solution to the following stacked linear system is solved for a window of K frames, $$W \begin{bmatrix} \begin{bmatrix} A_{11} & 0 & \ldots & \ldots \\ 0 & A_{21} & \ldots & \ldots \\ . & . & \ldots & \ldots \\ . & . & \ldots & A_{KN} \end{bmatrix} \\ \begin{bmatrix} I & -I & 0 & \ldots \\ \ldots & I & -I & \ldots \\ 0 & \ldots & \ldots & \ldots \\ 0 & \ldots & I & -I \end{bmatrix} \end{bmatrix} \begin{bmatrix} X_{11}^w \\ X_{21}^w \\ \ldots \\ X_{KN}^w \end{bmatrix} = \begin{bmatrix} b_{11} \\ b_{21} \\ \ldots \\ b_{KN} \\ 0 \\ \ldots \\ 0 \end{bmatrix}, \quad \text{(equation 7)}$$

$$W A_{full} X_{full}^w = b_{full}, \quad \text{(equation 8)}$$

where W is the weight matrix that describes the relative weights between the geometric constraints and the smoothing terms.

Generation of Collision Volumes

Figure 4B:
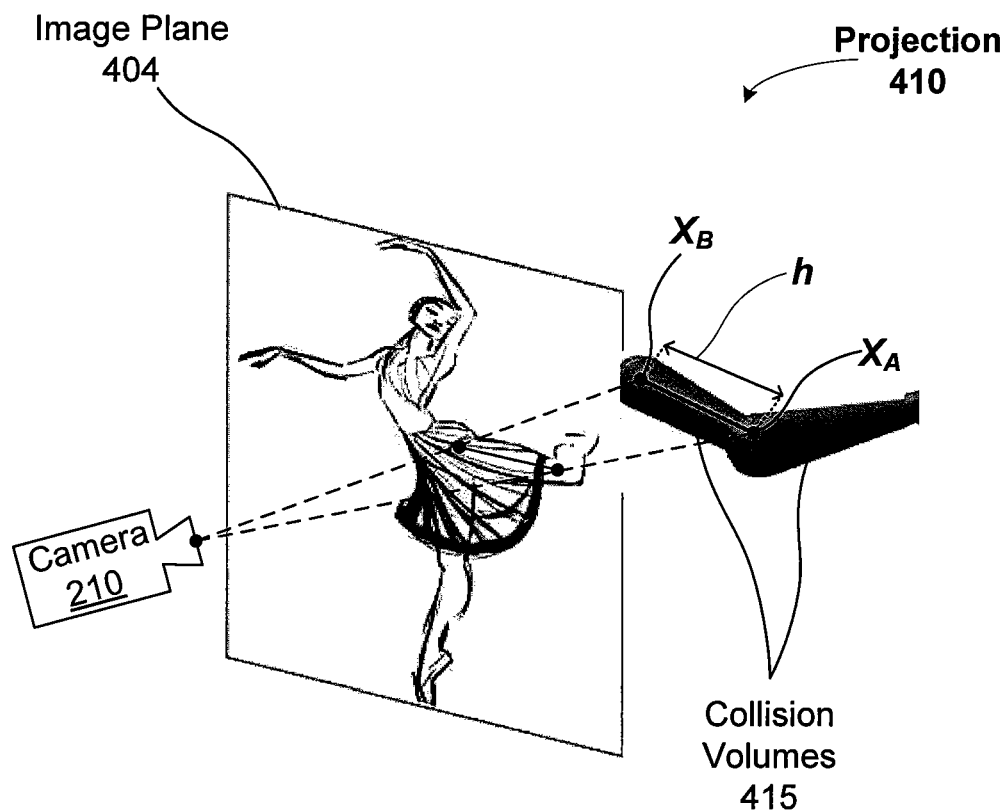
FIG. 4B is a diagram illustrating details of the back-projection of the 2D image into 3D space, according to one embodiment of the invention.
Figure 4B:
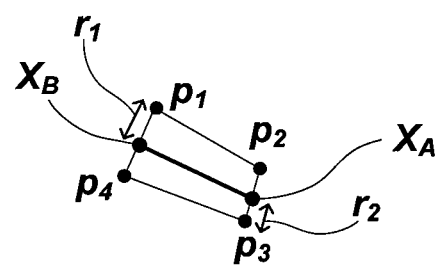

FIG. 4B is a diagram illustrating details of the projection of the 2D image into 3D space, according to one embodiment of the invention. In order to create believable interaction with complex simulations such as cloth, the space between the virtual markers is filled with collision volumes 415, modeled as tapered cylinders connected by spherical joints. Although the collision volumes are described as tapered cylinders, spheres and other shapes would be equally easy to register with the hand animation. Each cylinder must project to the image plane bounding box ($p_1, p_2, p_3, p_4$) for that limb. These bounding boxes are obtained as part of the user input. In one embodiment a semi-automatic routine is used which looks for the boundary as defined by the first black pixel in the direction perpendicular to the line joining markers A and B. In cases where the arm crosses the torso for example, the routine may incorrectly mark the boundary of the arm as the torso boundary. These cases may be corrected by a user. In this section, the details for one limb are explained, and the indices are omitted for clarity. Intuitively, the quadrilateral ($p_1, p_2, p_3, p_4$) is back-projected to the same z-depth as the 3D markers A and B. Then, the quadrilateral is rotated about the axis AB and the surface of revolution defines the collision volume for the limb AB. The axis vector $\vec{a}x$ and its magnitude (height) h are determined from the 3D world positions ($X_A$ and $X_B$) for the markers A and B. FIG. 4B illustrates these quantities.

The radii $r_1$ and $r_2$ for the faces of the tapered cylinder may then be determined. Let $P_q$ be the 3D world position for the image point $p_q$, where q=1,2,3,4. Linear equations for each point on the bounding box are solved. The back-projection is written out using the DLT algorithm (as in equation 3), $$CMP_q = p_g. \quad \text{(equation 9)}$$

The z-depth of $P_q$ is assumed equal to the z-depth of the corresponding limb marker, $$M(3,:) P_q = M(3,:) X_A \text{ for } q=1 \text{ and } 4, \quad \text{(equation 10)}$$

$$M(3,:) P_q = M(3,:) X_B \text{ for } q=2 \text{ and } 3. \quad \text{(equation 11)}$$

The final constraint sets the scale factor to unity, $$[0,0,0,1] P_q = 1. \quad \text{(equation 12)}$$

The radii for the faces of the tapered cylinder are then computed as, $$r_1 = \frac{\sqrt{\|P_1 - P_4\|_2}}{2}, r_2 = \frac{\sqrt{\|P_2 - P_3\|_2}}{2}. \quad \text{(equation 13)}$$

Simulation and Depth Compositing

The frame-by-frame 3D markers and collision volumes can be imported into a 3D modeling and animation software package. For example, the collision volumes for the hand-drawn character in FIG. 4B may be generated for the skeleton and the character's skirt and hair may be rendered 3D elements. As 3D scene elements, the hair and skirt can interact with other objects in the scene. In another example, a hand-drawn character may be composited with rendered 3D pom-poms attached to the character's hands and a rendered skirt attached to the character's waist. The character may be imported into a 3D modeling and animation software package. A dynamics engine may be used to physically simulate the motion of the pompoms and the skirt, and their interaction with the 3D collision volumes of the hand-drawn character. The 3D modeling and animation software package may also used for rendering. In addition to the 'beauty' pass which contains the scene elements with texture, lighting etc, a depth map and an occlusion map may also be rendered for the 3D elements.

In order to fully integrate a hand-drawn frame $\gamma_i^h$ with the rendered scene elements $\gamma_i^r$, depth ordering should be maintained during compositing. The depth map $\Delta_{i2}$ for the rendered scene element is obtained from the 3D modeling and animation software package. The depth map $\Delta_{i1}$ for the hand-drawn image is computed by linearly interpolating known depths.

For the skinned characters, the pixels belonging to a given limb may be obtained by segmentation (label annotations provided by a user). For stick figures, the dark pixels are segmented out by thresholding inside an oriented window along the limb v. The z-depth values for the pixels $\tilde{x}$ (that is, the pixels corresponding to the N virtual markers) are known. Therefore, for each limb v (v=1, 2, . . . V), the depth values for its two end-points are known. Let l denote the line joining the end-point markers for limb v, whose image positions are $\tilde{x}_a = (a_x, a_y)$ and $\tilde{x}_b = (b_x, b_y)$. Then, $$l = \frac{\tilde{x}_b - \tilde{x}_a}{\|\tilde{x}_b - \tilde{x}_a\|_2}.$$

Every pixel $\tilde{p}=(\tilde{p}_x,\tilde{p}_y)$ belonging to the limb is assigned the same depth as the point p closest to it on l.

This interpolation is performed for every limb to obtain the depth $\Delta_i^h$, and then scale it to match the units of $\Delta_i^r$.

Let $\eta_i^h$ be the occlusion map for the hand-drawn frame, and $\eta_i^r$ be the occlusion map for the rendered scene elements. The alpha matte $\alpha$ for the hand-drawn frame $\gamma_i^h$ is defined as the inverse of the gray-scale value. Drawings in RGB format, are first converted to grayscale using techniques known to those skilled in the art:

$$\gamma_{gray}^h = 0.298\gamma_i R^h + 0.587\gamma_i G^h + 0.114\gamma_i B^h, \quad \text{(equation 14)}$$

$$\alpha = (255 - \gamma_{gray}^h)/255. \quad \text{(equation 15)}$$

To incorporate depth ordering, for all pixels p where $\eta_i^n(p)=1$, $$\alpha = \alpha \text{ if } \Delta_i^h < \Delta_i^r, \text{ 0 otherwise}. \quad \text{(equation 16)}$$

The final composited image $I_{final}$ is $$I_{final_i} = \alpha\gamma_i^h + (1-\alpha)\gamma_i^r. \quad \text{(equation 17)}$$

Figure 5A:
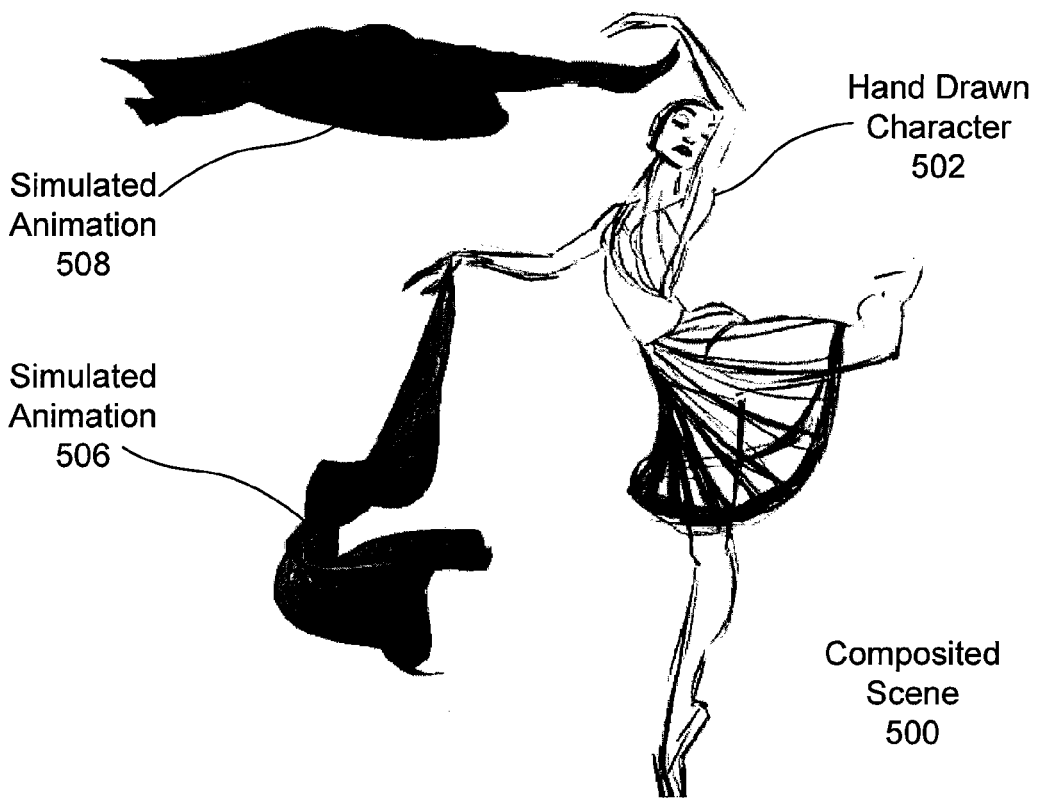
FIG. 5A illustrating a pose of the hand-drawn character augmented with secondary motion, according to one embodiment of the invention.

FIG. 5A illustrates a pose of the hand-drawn character 502 augmented with secondary motion in a composited scene 500, according to one embodiment of the invention. Two scarves are attached to the wrists of the hand-drawn character 502. A cloth simulation of the two scarves is driven by the three-dimensional trajectory of virtual markers on the wrists of the hand-drawn character 502. The two scarves interact with collision volumes for the body of the hand-drawn character 502 to produce simulated animations 508 and 506. A hand-drawn skirt is attached to virtual markers on the waist of the hand-drawn character 502.

Figure 5B:
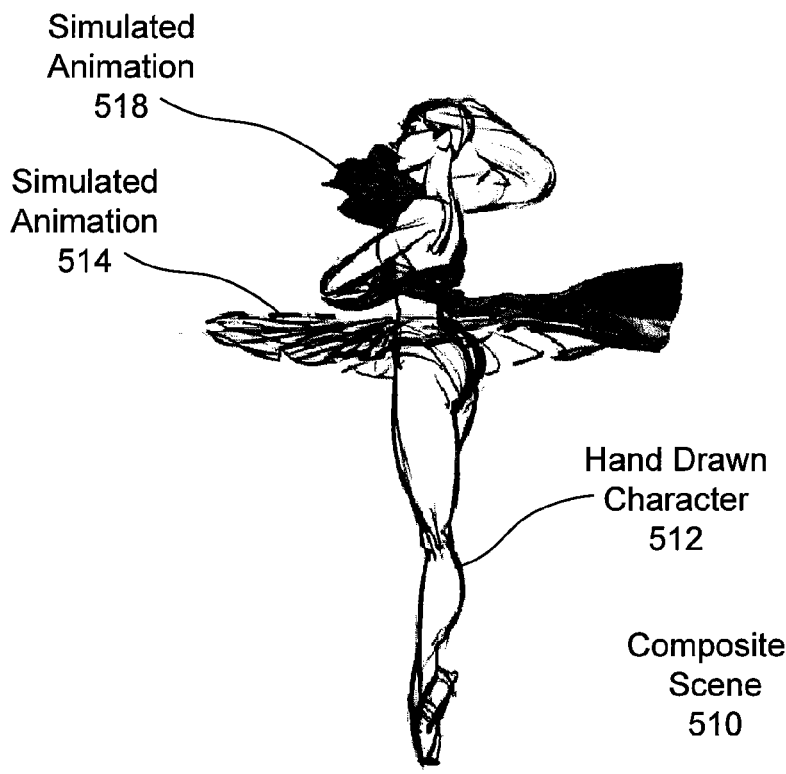
FIG. 5B illustrating another pose of the hand-drawn character augmented with secondary motion, according to on embodiment of the invention.
Figure 5F:
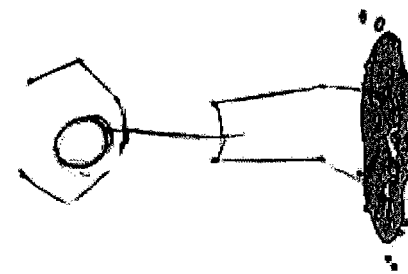
FIGS. 5C-5F illustrate examples of animation frames rendered with a hand-drawn character augmented with secondary motion of water in a puddle, according to one embodiment of the invention.

FIG. 5B illustrating another pose of the hand-drawn character 512 augmented with secondary motion in a composited scene 510, according to one embodiment of the invention. The two scarves interact with collision volumes for the body of the hand-drawn character 512 to produce simulated animations 518 and 516.

Figure 5E:
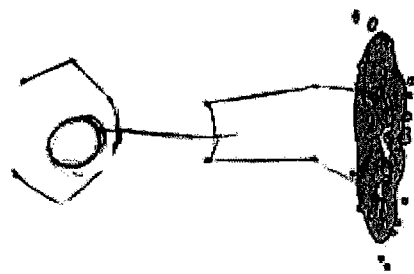
Figure 5D:
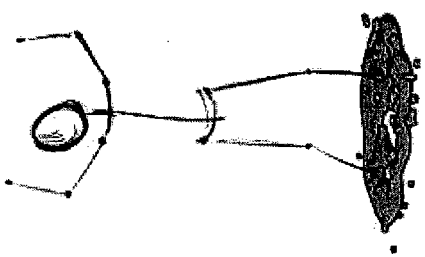
Figure 5C:
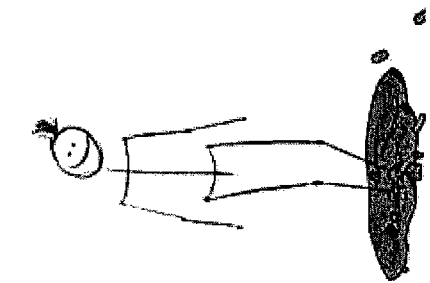

FIGS. 5C-5E illustrate examples of animation frames rendered with a hand-drawn character augmented with secondary motion of water in a puddle, according to one embodiment of the invention.

Delicate effects like the strands of pompoms may be created. These effects would be fairly time-consuming to hand animate with a comparable degree of detail. Effects such as cloth, particles and rigid bodies (the skirt in FIGS. 5A and 5B and the puddle in FIGS. 5C-5E) may be simulated. The motion is physically plausible, and tweaking of the secondary motion is just a matter of tuning parameters as with any simulation.

Advantageously, the techniques that add secondary motion onto a hand-animated character successfully preserve the animator's original lines while enabling the integration of simulated objects that interact with the hand-animated character. These techniques integrate well into the standard animator's pipeline. The 2D hand animation is "lifted" into 3D by employing user input and by using motion capture data of similar behaviors. Importantly, positions of the hand-drawn animation in the image plane are preserved and z-depth values are determined to generate collision volumes. The collision volumes may interact with the simulated 3D elements to produce the secondary motion.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method of constructing a three-dimensional animation, comprising:
    receiving a human-generated two-dimensional animation depicting an object in one or more scenes;
    receiving existing three-dimensional motion data that is generated from a separate source than the two-dimensional animation and stored in a library of three-dimensional motion data;
    constructing a collision volume associated with the object that is configured to interact with a simulated three-dimensional object, wherein the collision volume is formed by rotating a bounding surface about an axis that passes through at least two virtual markers associated with the object; and
    constructing a three-dimensional animation using image plane coordinates from the two-dimensional animation and depth coordinates from the three-dimensional motion data.

2. The method of claim 1, further comprising:
    receiving annotations including (x,y) positions of the virtual markers associated with the two-dimensional animation; and
    associating the virtual markers in the two-dimensional animation with (x,y,z) positions of the three-dimensional motion data.

3. The method of claim 2, further comprising determining a z coordinate of a first (x,y) position of a first virtual marker based on a first (x,y,z) position of the three-dimensional motion data that is associated with the first virtual marker as a depth value of the first virtual marker.

4. The method of claim 2, further comprising:
    rendering the simulated three-dimensional object that interacts with the collision volume to generate a rendered three-dimensional object with secondary motion.

5. The method of claim 2, combining the two-dimensional animation with the rendered three-dimensional object to generate a two-dimensional animation augmented with secondary motion.

6. The method of claim 2, further comprising:
    determining z coordinates of (x,y) positions of the virtual markers based on (x,y,z) positions of the three-dimensional motion data to generate depth values for the respective virtual markers; and performing depth compositing using the depth values to combine the two-dimensional animation with a rendered three-dimensional object.

7. The method of claim 2, wherein a first virtual marker is located on the object at a collision point between the object and the simulated three-dimensional object.

8. The method of claim 2, wherein a first virtual marker is located on the object at an attachment point between the object and the simulated three-dimensional object.

9. The method of claim 2, further comprising:
determining z coordinates of (x,y) positions of the virtual markers based on (x,y,z) positions of the three-dimensional motion data to generate depth values for the respective virtual markers and to generate the two-dimensional animation back-projected into three-dimensional space; and
rendering the two-dimensional animation projected into three-dimensional space as a first image of a stereo image pair from a first camera view; and
rendering the two-dimensional animation back-projected into three-dimensional space as a second image of the stereo image pair from a second camera view.

10. The method of claim 2, further comprising processing or filtering the a z position of the three-dimensional motion data before determining a z coordinate of a first (x,y) position of a first virtual marker.

11. The method of claim 1, wherein the object is a character and (x,Y,z) positions of the three-dimensional motion data are associated with virtual markers on the character in the two-dimensional animation.

12. The method of claim 1, wherein the three-dimensional motion data comprises motion of a camera.

13. The method of claim 1, wherein the three-dimensional motion data is motion capture data.

14. The method of claim 1, wherein the three-dimensional motion data is keyframe data.

15. The method of claim 1, further comprising:
rendering the two-dimensional animation projected into three-dimensional space as a first image of a stereo image pair from a first camera view; and
rendering the two-dimensional animation back-projected into three-dimensional space as a second image of the stereo image pair from a second camera view.

16. The method of claim 1, wherein the three-dimensional motion data is selected by a user.

17. The method of claim 1, wherein the two-dimensional animation is a hand-drawn animation.

18. The method of claim 1, wherein the three-dimensional motion data comprises a combination of motion capture segments.

19. A computer-readable storage medium storing instructions that, when executed by a processor, cause a computer system to perform an operation for constructing a three-dimensional animation, the operation comprising:
receiving a human-generated two-dimensional animation depicting an object in one or more scenes;
receiving existing three-dimensional motion data that is generated from a separate source than the two-dimensional animation and stored in a library of three-dimensional motion data;
constructing a collision volume associated with the object that is configured to interact with a simulated three-dimensional object, wherein the collision volume is formed by rotating a bounding surface about an axis that passes through at least two virtual markers associated with the object; and
constructing a three-dimensional animation using image plane coordinates from the two-dimensional animation and depth coordinates from the three-dimensional motion data.

20. A method of constructing a two-dimensional animation augmented with secondary motion, comprising:
receiving a human-generated two-dimensional animation;
receiving depth values from computer-generated three-dimensional motion data;
constructing a collision volume of an object in the two-dimensional animation, wherein the collision volume is formed by rotating a bounding surface about an axis that passes through at least two virtual markers associated with the object;
rendering a simulated three-dimensional object that interacts with the collision volume to generate a rendered three-dimensional object with secondary motion; and
combining the two-dimensional animation with the rendered three-dimensional object to generate the two-dimensional animation augmented with secondary motion.

21. The method of claim 20, further comprising receiving annotations including (x,y) positions of the virtual markers located on the object that are associated with respective (x,y,z) positions of the three-dimensional motion data.

22. The method of claim 21, further comprising determining a z coordinates of the (x,y) positions of the virtual markers based on the respective (x,y,z) positions of the three-dimensional motion data to generate depth values for the virtual markers.

23. The method of claim 21, wherein a first virtual marker is located on the object at a collision point between the object and the simulated three-dimensional object.

24. The method of claim 21, wherein a first virtual marker is located on the object at an attachment point between the object and the simulated three-dimensional object.

25. The method of claim 21, further comprising:
determining z coordinates of (x,y) positions of the virtual markers based on (x,y,z) positions of the three-dimensional motion data to generate depth values for the respective virtual markers; and
performing depth compositing using the depth values to combine the two-dimensional animation with the rendered three-dimensional object.

26. The method of claim 20, wherein the object is a character and (x,y,z) positions of the three-dimensional motion data are associated with virtual markers on the character in the two-dimensional animation.

27. The method of claim 20, wherein the two-dimensional animation is a hand-drawn animation.

28. The method of claim 20, further comprising:
rendering the two-dimensional animation projected into three-dimensional space as a first image of a stereo image pair from a first camera view; and
rendering the two-dimensional animation back-projected into three-dimensional space as a second image of the stereo image pair from a second camera view.

29. The method of claim 20, wherein the three-dimensional motion data comprises motion of a camera.

30. A computer-readable storage medium storing instructions that, when executed by a processor, cause a computer system to perform an operation for constructing two-dimensional animation augmented with secondary motion, the operation comprising:
receiving a human-generated two-dimensional animation;
receiving computer-generated three-dimensional motion data;

constructing a collision volume of an object in the two-dimensional animation, wherein the collision volume is formed by rotating a bounding surface about an axis that passes through at least two virtual markers associated with the object;

rendering a simulated three-dimensional object that interacts with the collision volume to generate a rendered three-dimensional object with secondary motion; and combining the two-dimensional animation with the rendered three-dimensional object to generate the two-dimensional animation augmented with secondary motion.

* * * * *